ROBERT F. PFOST
INVENTOR.

BY Nathan N. Kallman
ATTORNEY

ROBERT F. PFOST
INVENTOR.

BY Nathan N. Kallman

ATTORNEY

ROBERT F. PFOST
INVENTOR.

BY Nathan N. Kallman

ATTORNEY

June 28, 1966 R. F. PFOST 3,258,542

WEDGE-SHAPED MAGNETIC TRANSDUCER

Filed April 17, 1961 4 Sheets-Sheet 4

ROBERT F. PFOST
INVENTOR.

BY Nathan N. Kallman

ATTORNEY

United States Patent Office 3,258,542
Patented June 28, 1966

3,258,542
WEDGE-SHAPED MAGNETIC TRANSDUCER

Robert F. Pfost, Mountain View, Calif., assignor to Ampex Corporation, Redwood City, Calif., a corporation of California Filed Apr. 17, 1961, Ser. No. 103,424
6 Claims. (Cl. 179—100.2)

This invention relates to a method and means for manufacturing magnetic transducers, and in particuar to a method and means for making and employing magnetic heads formed substantially from a ferrite material.

Ferrites are highly preferable for use as cores of magnetic transducers or heads because they are relatively hard, afford lower losses during the recording and reproducing modes, and operate well at high frequencies. However, during manufacture and in operation the well-defined, sharp corners of the ferrite material at the junction formed by the nonmagnetic gap and the ferrite have a tendency to chip and crack and, in general, erode away until satisfactory operation of the transducer is no longer possible due to poor resolving power.

In the prior art, heads utilizing ferrite cores have been made with metallic pole pieces, such as Alfenol, disposed on either side of the nonmagnetic gap to provide a mechanically strong structure. However, such a head structure is subject to rapid wear requiring frequent replacement when operating in contact with magnetic tapes, especially at high relative speeds. Furthermore, changes in structure of the head due to abrasion and wear vary the resolution and sensitivity characteristics of the head. In addition, the manufacture of such heads is tedious, time-consuming and uneconomical because they must be manufactured individually to provide proper gap dimensions.

It has been proposed to employ a glass bond or embedment to form the nonmagnetic gap of a ferrite core transducer to provide improved head wear resistance, to minimize gap erosion, and to provide improved gap definition, better resolution and greater sensitivity. But the manufacture of glass gap heads for use in video, television or high frequency magnetic tape apparatus necessitates special techniques. For example, in a television tape recorder that utilizes a plurality of expensive magnetic heads having relatively narrow gaps disposed circumferentially on a rotary drum, the heads need be perfectly aligned and properly adjusted to avoid phasing errors and improper head-to-tape contact. Therefore, it would be desirable to provide a method for manufacturing ferrite core magnetic heads by mass production methods wherein all the heads have substantially the same precise configuration, and still derive the advantages and features of a ferrite core head having a gap formed by means of a glass bond.

An object of this invention is to provide a novel and improved method for manufacturing a magnetic transducer utilizing a ferrite material as the core.

Another object of this invention is to provide an improved method for forming a ferrite core transducer having a relatively narrow nonmagnetic gap with a nonmagnetic rigid material disposed in the gap to provide structural strength.

Another object is to provide a method for manufacturing precisely formed ferrite core heads having accurate gap dimensions on a mass production basis in an economical manner.

Another object of this invention is to provide a magnetic transducer having a ferrite core and a glass gap, such glass forming a chemical bond so as to establish a substantially continuous molecular structure but a discontinuous magnetic structure.

A further object is to provide a magnetic transducer assembly formed with ferrite cores having a glass body accurately forming the nonmagnetic gap.

Still a further object is to provide a rotary drum transducer assembly incorporating a plurality of substantially identical ferrite heads having a similar accurate gap dimensions formed by means of a glass material.

According to this invention, a plurality of lapped and polished ferrite slabs of high density and low porosity have a series of spacer layers or strips deposited on one surface, the thickness of such layers determining the gap length of a finished transducer. A like plurality of similar ferrite slabs are coated with a thin layer of glass on a corresponding surface, such glass having a coefficient of thermal expansion essentially the same as that of the ferrite material. All the slabs are sliced transversely to the parallel spacer strips into ferrite blocks. Each ferrite block having spacer strips is fused to a block having a glass layer, by heating the glass to melting while the blocks are clamped under high pressure in a neutral atmosphere. After cooling, the joined blocks are severed along the spacer strips to provide transducer size units having a nonmagnetic glass gap ready for further shaping and assembly. The shaped and finished transducer assemblies are all substantially uniform in dimension and physical characteristics, and a multiplicity of such mechanically stable transducers may be mounted in equally spaced relation about the periphery of a rotary drum assembly of a magnetic tape appartus to provide recording and reproducing operation that has high resolution and improved sensitivity.

In an embodiment of this invention, a ferrite material having relatively high density and low porosity is cut and lapped into rectangular type slabs, which are polished and then heated to eliminate any contaminants. A plurality of parallel layers of spacer material having a high melting point are deposited longitudinally on one surface of half of the slabs, and a thin layer of glass having a relatively low melting temperature is deposited coextensively on a corresponding surface of the other half of the slabs. The slabs having the spacer material are then cut transversely relative to the length of the spacer strips, and the slabs having the glass are cut along the same transverse dimension thereby providing ferrite blocks with one dimension that is close to the overall height of the finished transducer.

Each ferrite block having the spacer strips is fused to a ferrite block having a layer of glass under very high pressure, thus causing the two blocks to settle together against the spacer material, thereby forcing the melted glass that is present in excess to flow out from between the blocks. The blocks are thus joined at the surfaces carrying the spacer and glass material respectively, thereby forming a magnetic body having a nonmagnetic layer disposed in a substantially central plane therein that will serve as the nonmagnetic gaps of several magnetic transducer or heads. The joined block assembly has portions cut back to provide a smaller surface for contacting a magnetic tape that will cooperate with such surface during the recording or reproducing modes. The block assemblies are then partitioned into transducer size units by cutting along the lines of the spacer strips thereby entirely eliminating the spacer material. Thus, a plurality of unitary or integral transducer units in the form of fused ferrite block portions, each having a nonmagnetic gap material of glass centrally secured therein that forms a molecular bond with the ferrite, are provided ready for further machining to a desired shape.

To accommodate an energizing coil such as is conventionally used with magnetic transducers, an aperture is introduced through the transducer unit along the plane of the rigid gap material through a portion thereof close to the effective gap face at a predetermined location. The effective gap face or front gap surface is defined as that which the magnetic tape traverses during operation of the magnetic tape apparatus, in contrast to the rear gap surface that is not employed directly in the transducing process. Thus, a high reluctance magnetic path is provided by disposition of the aperture adjacent to the effective gap.

The transducer is then tapered to a wedge-like shape from the rear gap surface to the front gap surface so that the width of the effective gap, i.e., the dimension of the surface of the front gap perpendicular to the longitudinal movement of the tape, corresponds closely to the width of the tape track to provide enhanced sensitvity by virtue of the large rear gap area as compared to the front gap areas, thereby providing a considerably lower rear gap reluctance than would exist if the entire transducer were constant in thickness. However, since the width of the rear gap surface is maintained substantially larger, additional structural strength is provided for the transducer assembly. After tapering of the transducer unit, the energizing coil is coupled to the transducer.

The finished transducer assembly having the wedge shape is then joined by means of an assembly jig to a nonmagnetic mounting shoe having a cooperating wedge-like cutout. The shoe is precisely positioned on a rotary drum assembly of a magnetic tape apparatus in a similar relation as when positioned on the jig so that the transducer becomes fixed on the drum whereby only a predetermined gap portion projects from the drum periphery for contact with a magnetic medium or tape. When a plurality of shoe mounted transducers are assembled to the rotary drum, the precision mounting of transducer to shoe and shoe to drum assures that all the transducer front gap faces protrude substantially the same amount from the periphery of the drum along a radial direction. Furthermore, simple means are provided to adjust the quadrature or phasing relation of the transducers, and once such adjustment is made, such relation remains fixed during operation for practical purposes.

The invention will be described in greater detail with reference to the drawing in which.

Figure 1:
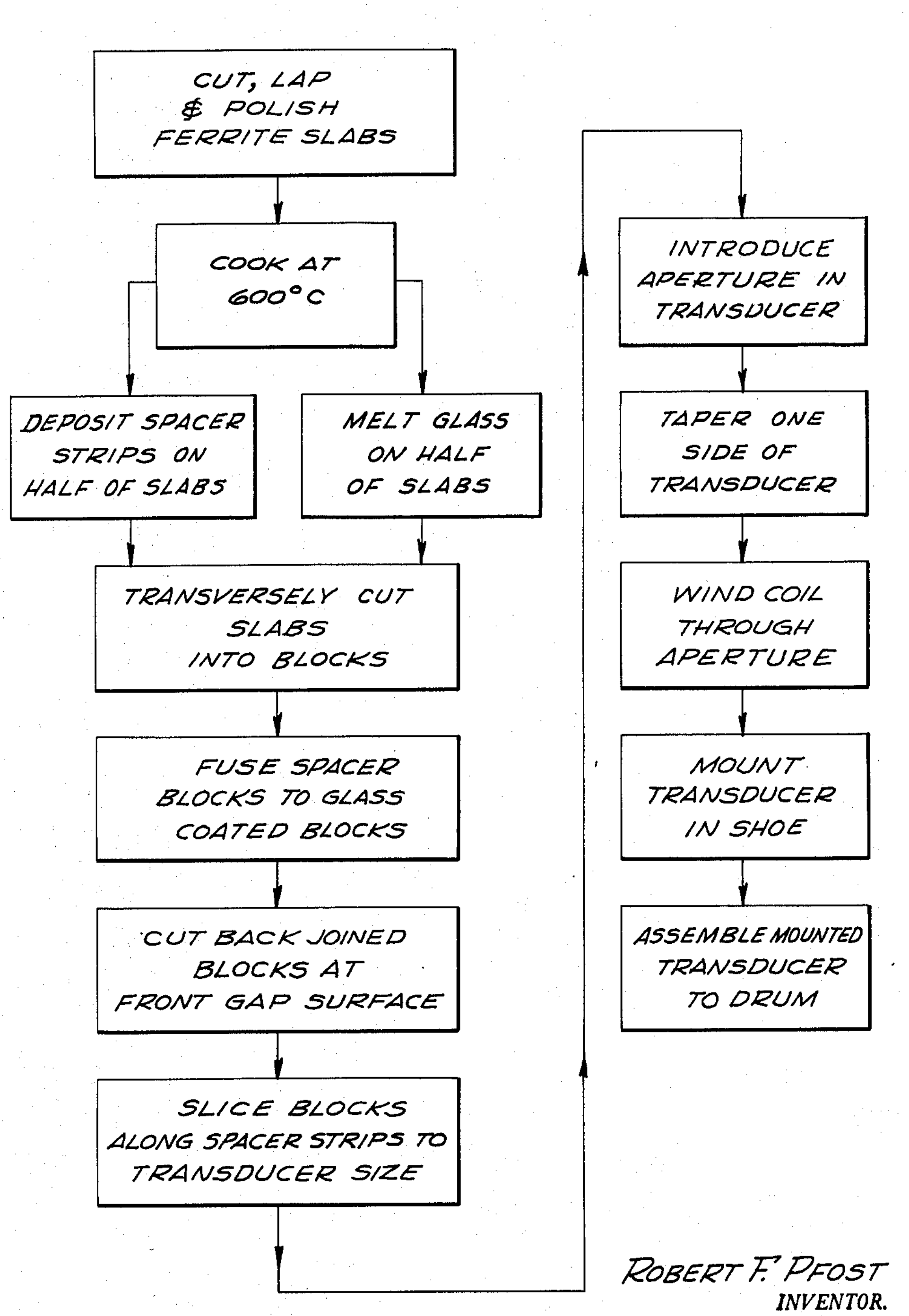
FIGURE 1 is a flow chart setting forth various steps of the inventive method.

To aid in the explanation of the invention, the following letters will be used hereinafter as follows:

*t*—the overall length of the transducer unit in the direction of tape travel

*f*—the width of the front gap surface that is perpendicular to the direction of the moving tape, and that approximates the width of a tape track that will cooperate with the transducer during record or reproduce operation

*r*—the width of the rear gap surface that is parallel to the dimension *f*

*h*—the height of the transducer unit measured from the effective gap face or front gap surface to the rear gap surface, and orthoganally to both surfaces Similar numerals and designations refer to similar elements throughout the drawing.

Figure 2:
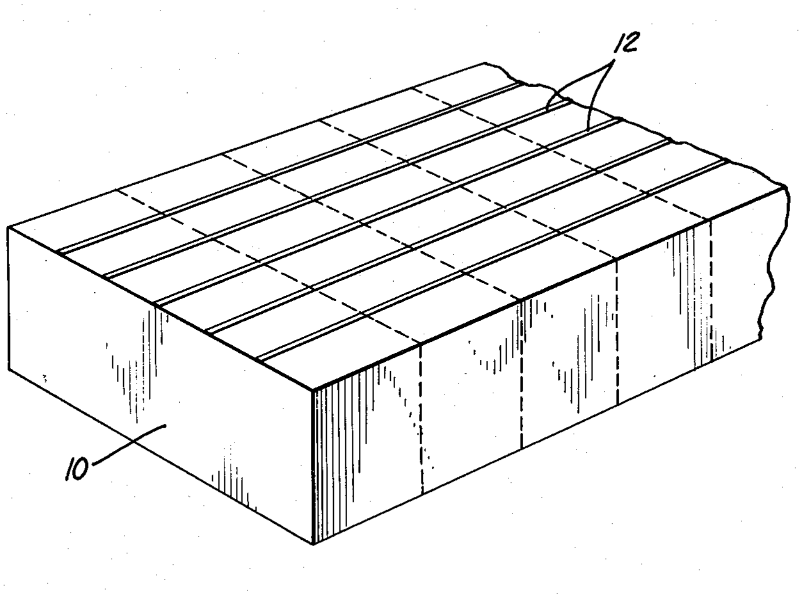
FIGURE 2 is a perspective view of a cut and polished ferrite slab having spacer layers deposited thereon, in accordance with the invention.

In accordance with an embodiment of the invention, a ferrite body that may be formed from a ferrite material is cut, parallel lapped into several rectangular slabs, and one longitudinal surface of each slab is polished to a specular finish under a high pressure of about 60–100 lbs. per square inch on an optically smooth surface. As indicated in the flow chart of FIGURE 1, the ferrite slabs are heated or "cooked" at about 600° centigrade to remove undesirable contaminants. Thereafter, one-half of the slabs 10 have a series of evenly spaced parallel linear layers of spacer material 12 deposited thereon, as shown in FIGURE 2. The thickness of the slab 10 may be about one-half of the desired overall length, *t*, of the finished transducer, *t* being about .250 inch. The spacer material 12 may be silicon monoxide or aluminum oxide, for example, that has been deposited by evaporation, spraying, or other known methods for depositing a precise thickness of material. Each spacer strip 12 may be approximately .008 inch wide and approximately 80 microinches deep, by way of example, such layer thickness being instrumental in determining the ultimate effective gap length. The spacing between each of the strips may be .046 inch, for example, such dimension serving to determine the approximate extent of *r*, the rear gap surface, and also to limit the width, *f*, of the effective front gap surface.

Figure 3:
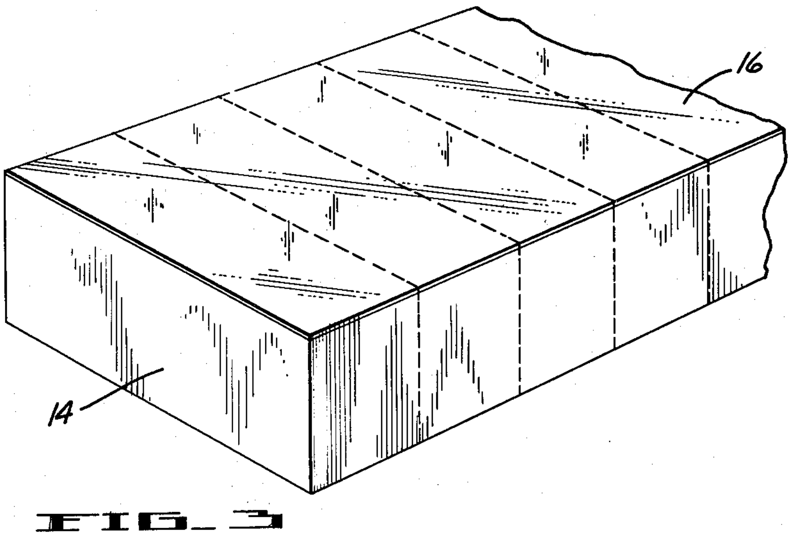
FIGURE 3 is a perspective view of a cut and polished ferrite slab having a glass layer deposited thereon.

On the other half of the slabs 14, a thin glass layer 16 is deposited, as shown in FIGURE 3, coextensively on a surface corresponding to the surface of the slab 10 on which the spacer material 12 is deposited. The glass 16, which has a low melting temperature relative to the spacer material 12 and a coefficient of thermal expansion substantially the same as that of the ferrite, preferably is noncorrosive, and is of such composition that the magnetic properties of the ferrite are not affected by fusion of the ferrite and glass. The glass layer 16 may be melted onto the ferrite slab 14 at about 550–900° centigrade, which temperature is sufficient to soften the glass and to cause the glass to wet the ferrite.

Figure 4:
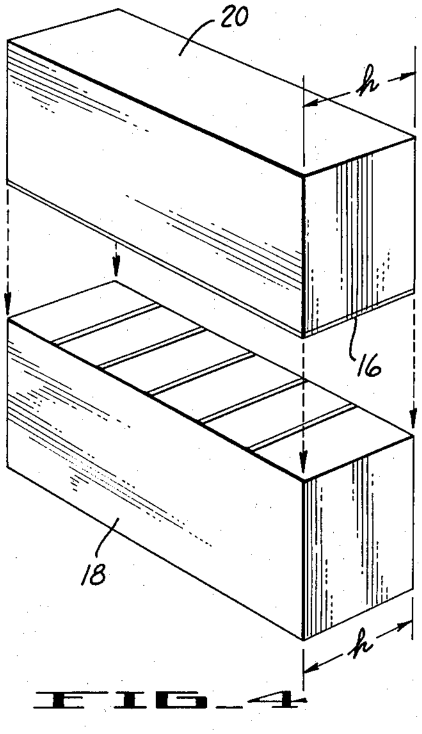
FIGURE 4 is a perspective view of two ferrite blocks cut from the slabs of FIGURES 2 and 3 respectively, and processed ready for joining.

With the slab 10 properly dimensioned, and each surface in orthogonal relationship to the adjacent surfaces, the ferrite slab 10 with the spacer material is cut transversely to the spacer strips 12 to provide blocks 18 such as shown in FIGURE 4, such blocks 18 having a dimension approximately the overall height *h* of the finished transducer. At the same time, the ferrite slab 14 is cut along the same dimension as the slab 10 to provide glass coated blocks 20, such as shown in FIGURE 4, for joining with the blocks 18.

The ferrite blocks 18 and 20 are joined by setting the glass coated block 20 onto the block 18 with the surface having the spacer lines 12 facing the corresponding surface having the glass layer 16. With the blocks 18 and 20 securely fixed relative to each other, high pressure of about 3000 lbs. per square inch may be applied when the glass commences to soften, urging the blocks closer together until both surfaces are resting against the spacer strips. The block assembly 22 is heated in a neutral atmosphere, such as in an environment of an inert gas as argon, at a temperature between 550–900° centigrade which is sufficient to allow the excess melted glass to flow from between the blocks. The glass 16, having a relatively low melting point, flows and fills in the areas between the layers of spacer material 12, and the excess glass is forced out from between the contiguous surfaces during the fusing process. The assembly 22 is cooled to an ambient room temperature thereby causing the blocks 18 and 20 to be integrally joined by means of the glass bond 16 that has a thickness of approximately 80 microinches, such as determined by the thickness of the spacer material 12.

Figure 5:
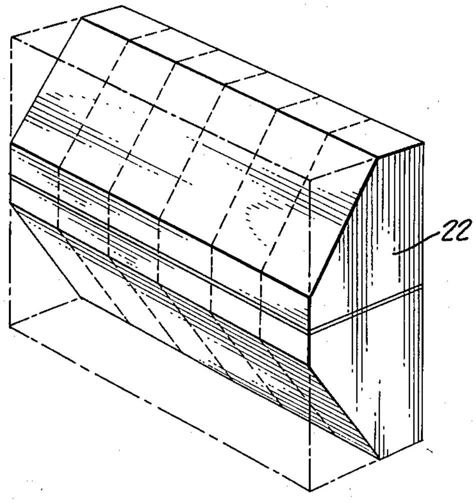
FIGURE 5 shows a joined ferrite block assembly that has been cut back according to the invention.

The joined assembly 22 is lapped and polished, and the gap width is checked and inspected under a microscope. At this point, the assembly 22 is ground down by cutting back at about a 30° angle at each end of the front gap surface until the total area of the front gap surface is reduced in length $t$ from .25 inch to about .080 inch, as indicated in FIGURE 5. The reduced front gap surface allows satisfactory unit pressure at the gap area to be obtained with a low total force between the transducer and the tape. This low total force subjects the recording medium to decreased mutilation and lessens the frictional effects thus preventing oxide deposits from building up on the transducer and providing increased tape life.

Figure 6:
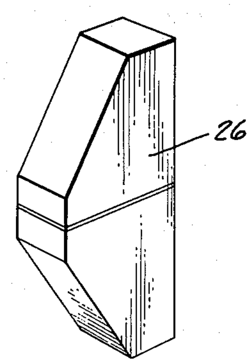
FIGURE 6 represents a transducer size ferrite unit partitioned from the assembly of FIGURE 5.

Thereafter, the joined assembly 22 is partitioned by cutting along the spacer lines 12, with a diamond saw that has a width of about .013 inch, for example, which is slightly larger than the .008 inch width of the spacer layers, thus eliminating the spacer material 12 from the ferrite assembly 22. Also, as the .008 inch wide layers are spaced at about .040 inch, the cutting operation provides gap faces, rear and front respectively, that are each about .035 inch wide. The severed units or blanks are now in a desired transducer size 26, as shown in FIGURE 6, and need only be shaped to a desired configuration and wired to serve as a magnetic recording or reproducing head.

Figure 7:
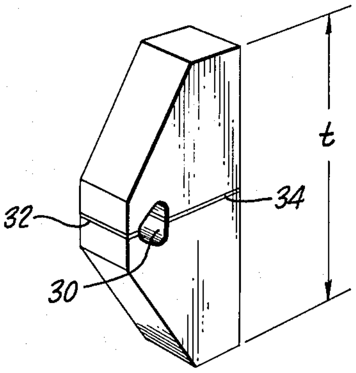
FIGURE 7 illustrates a transducer unit with an aperture formed therein.

To allow for electrical coupling of an energizing coil 28 to the transducer unit 26, an aperture 30 of about .025 inch in diameter is drilled along the plane of the glass bond 16 through the transducer unit 26, but asymmetrically relative to the front gap 32 and rear gap 34 (FIGURE 7). The aperture 30, which may be formed by ultrasonic means for example, is located preferably close to the effective front gap 32, about .028 inch from the aperture center to the front gap surface 24 (FIGURES 8, 9 and 10), to provide a high reluctance magnetic path adjacent thereto. The aperture 30 is preferably pear shaped to provide increased mechanical strength and reduced reluctance in the area adjacent to the front gap.

Figure 8:
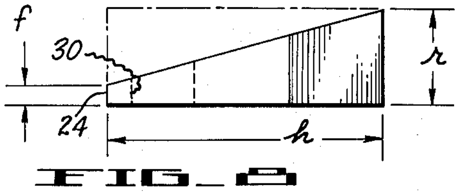
FIGURE 8 is an enlarged end view of the same transducer unit after tapering, in accordance with one aspect of the invention.
Figure 9:
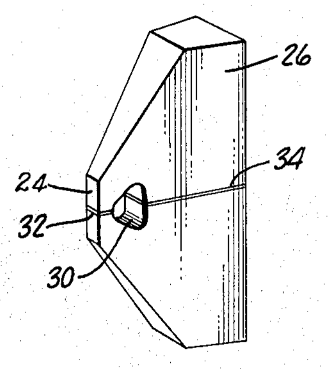
FIGURE 9 depicts the shaped transducer unit of FIGURE 8 in a front perspective view.
Figure 10:
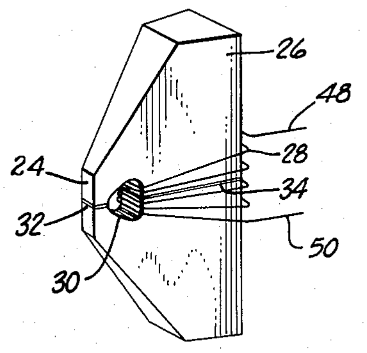
FIGURE 10 shows a shaped transducer with an energizing coil coupled thereto.
Figure 11:
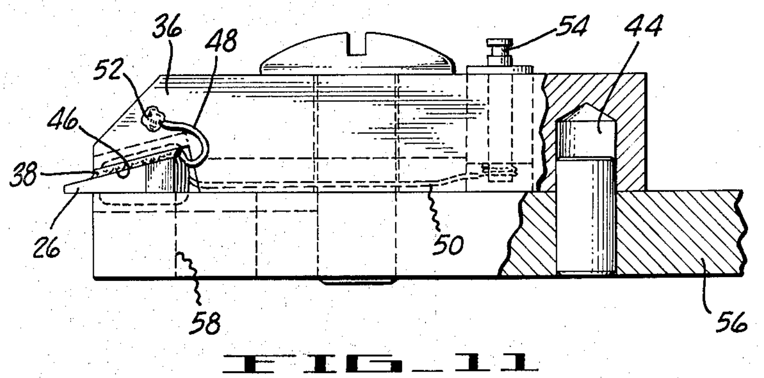
FIGURE 11 is a fragmentary elevational view of a rotary drum assembly, partly cut away, with a shoe mounted transducer, in accordance with this invention.
Figure 12:
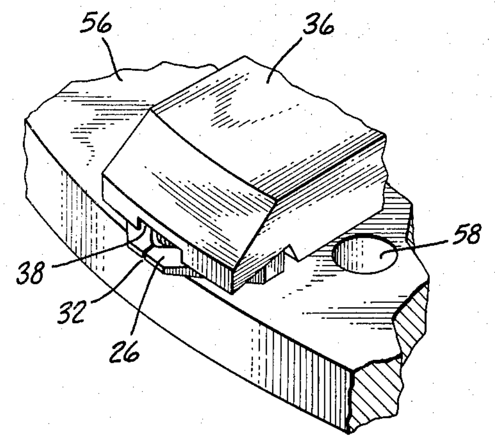
FIGURE 12 is a fragmentary perspective view of a portion of the rotary drum assembly, partially showing the shoe and transducer at the drum periphery.

In accordance with another feature of the invention, the transducer unit 26 is shaped into a wedge-like form by tapering one side from the rear gap 34 to the front gap 32 at about an angle of 14°, as illustrated by FIGURES 8 and 9. Improved sensitivity is afforded because the ratio of the reluctance of the front gap 32 relative to that of the rear gap 34 is increased, and at the same time a strong mechanical structure is provided. The wedge type transducer 26 conforms with a rotary drum mounting shoe 36 that has an accommodating retaining cutout portion 38, such as shown in FIGURES 11 and 12, to be described hereinafter. Finally, a coil 28 of insulated copper wire is wound through the aperture 30 and around the rear face of the transducer 26 for transducing the processed signal, as shown in FIGURE 10.

Figure 13:
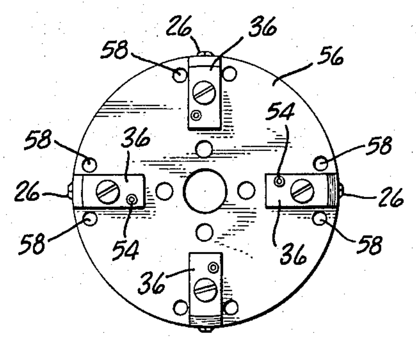
FIGURE 13 is a plan view of an embodiment of a rotary drum assembly carrying a plurality of transducers, in accordance with one aspect of this invention.

The wire wedge-shaped transducer 26 is then joined to a nonmagnetic mounting shoe 36 as shown in FIGURES 11–13, that has a notched portion 38 cut away that corresponds in shape to the wedge shape of the transducer. The joining of the transducer 26 and the shoe 36 may be achieved by utilizing a jig fixture, which may have a mounting pin 44 accurately positioned relative to the desired gap position. A finished transducer 26 is held securely in a precisely located position with the tapered side up and the flat side on the surface of the fixture by a magnet or other retaining means, while an epoxy resin 46 is placed on the tapered surface of the transducer. The shoe 36, having an opening that closely engages the pin 44 in sliding engagement for fixing the shoe 36 relative to the gap location is placed over the transducer 26 and onto the fixture surface thereby fastening the transducer 26 and shoe 36 together by means of the epoxy resin 46.

For single-ended operation in a tape apparatus, leads 48 and 50 of the coil 28, after removal of the shoe from the fixture, are respectively connected to a point 52 on the side of the shoe 36 by soldering to provide a point of reference potential, such as ground, and to an electrical terminal 54 that projects from the top surface of the shoe 36. For balanced operation, two projecting terminals may be provided. The copper coil 28 and leads 48 and 50 are suitably insulated from the surrounding metallic conducting components of the assembly. Since each transducer 26 is positioned precisely on the same spot of the assembly jig, and because each machined shoe 36 is set on an accurately located pin 44, the various mounted transducer assemblies correspond in that each transducer is uniformly positioned relative to each shoe. Thus the front gap 32 of each transducer projects approximately the very same distance from the edge of the shoe 36 and the periphery of a rotary drum 56 that is incorporated in a magnetic tape apparatus. Therefore, when any transducer carrying shoe 36 manufactured according to the invention is mounted on a rotary drum assembly 56 having a locating pin set at a corresponding radial distance from the drum edge as the pin 44, either initially or for replacement purposes, the transducer front gap 32 presents substantially the same projecting face to a magnetic medium or tape as any other transducer 26 mounted in a similarly made shoe 36.

In order to provide improved sensitivity, the front gap surface 24 may be ground down to decrease the height of the nonmagnetic gap, i.e., the distance between the front gap 32 and the aperture 30, which may be about .003 inch for example. Additional tapes may be used to contour and polish the front gap surface 24 prior to operation in a magnetic tape apparatus.

When mounted on a rotary drum 56 in a magnetic tape apparatus, the notched portion 38 of the shoe 36 provides a securing force to the transducer 26 that opposes the centrifugal force of rotation, and aids the retaining force of the epoxy resin 46. It is noted that substantially all forces applied to the transducer 26 during operation are in a radial direction, and there are practically no circumferential forces that may vary the angular alignment or azimuth of the shoe 36. Thus, the initial quadrature relationship between a plurality of mounted transducers is maintained substantially constant during operation.

In keeping with this aspect of the invention, the rotary drum 56 may also include a pair of holes 58 closely adjacent to each shoe 36 that serve for adjustment of quadrature and phase accuracy when a plurality of transducers are utilized. When any transducer 26 is found to be out of quadrature during the initial assembly, an eccentric tool is engaged with one of the holes 58, and mechanical pressure is used to vary the quadrature position of the shoe 36 carrying the transducer 26. Once so adjusted, the need for further adjustment should not be necessary. Thus, the invention proposed herein affords a mass production method for manufacturing a novel and improved magnetic transducer assembly. In addition to the saving of time, tedious hand operations are minimized, and the method lends itself to manufacturing without highly skilled workers. Thus, human error is not as important a factor, and the final product has the added features of precision and mechanical strength.

Also, the magnetic transducer and rotary drum assembly provided by the invention affords several advantages and features that are not found in prior art tape apparatus and that are especially desirable. All the clamping forces associated with the drum assembly are in a direction that minimizes drift and quadrature problems. Furthermore, a simple quadrature adjustment is provided during manufacture and assembly. The mounting shoe and fixed locating pin on the drum position the transducer accurately so that the ferrite head penetrates into the tape for a relatively short distance compared to the head-to-tape contact experienced in prior art apparatus. The wedge-shaped transducer and cooperating cutout of the shoe provided a strong mechanical structure with a narrow front gap surface. Thus, there is less pressure exerted on the tape, less frictional heating, and consequently reduced wear and tear of both head and tape. In addition, the transducer aperture location affords a better reluctance ratio and higher operating efficiency. Also, although the transducers are mechanically locked in, they may be easily replaced and as all the transducers are practically uniform, a minimum of adjustment is necessary. Another major feature of the invention is the provision of a nonmagnetic glass gap in a ferrite core that allows increased head life with improved resolution.

It is understood that the scope of the invention is not limited to the particular steps of the method described, nor to the materials or dimensions set forth herein. For example, a rotary drum may carry one or more transducers around its periphery. Also, matched semicircular slots may be made in each block 18 and 20 prior to fusing to provide an aperture, closely similar to the aperture 30, when the blocks are joined. Instead of a copper coil, a single turn of copper or a silver conducting film may be used in the aperture for electrical signal processing, and the spacer material 12 may be platinum. Also, the thickness of the glass gap is not limited to the dimension shown, but may be made as large or as small as available glass layers may permit, such glass layers having a relatively low melting temperature for fusing the blocks together.

What is claimed is:

1. A magnetic transducer assembly comprising: a wedge-shaped ferrite body having a front gap and a rear gap said wedge-shaped body having an inclined side formed along a plane which cuts across both said gaps to define a front gap having an area substantially smaller than said rear gap; a glass bond disposed centrally in a plane that bisects said ferrite body and serving as a front gap spacer and a rear gap spacer, said body having an aperture formed along the plane of said bond, said aperture being substantially closer to said front gap than to said rear gap to further decrease the area of said front gap with respect to said rear gap and provide a high reluctance magnetic path adjacent to a magnetic medium that contacts said front gap.

2. A magnetic transducer assembly comprising: a ferrite body with a rear gap and front gap, said body having a substantially wedge-shaped configuration formed by an inclined side thereof which extends between and cuts across both the rear gap and the front gap; a gap material secured within said gaps and formed centrally within said ferrite body, said body having an aperture disposed along the plane of said gaps to farther define same; and means for applying an electrical signal coupled to said aperture.

3. A magnetic transducer assembly as in claim 2 wherein said body is cut back at either side of said front gap to provide less surface area for contacting a moving magnetic medium during the transducing process.

4. The structure recited in claim 2 wherein said aperture has a given diameter and its center is spaced within an order of a diameter from said front gap and more than an order of a diameter from said rear gap surface.

5. The structure recited in claim 4 wherein said diameter is less than about .050 inch.

6. A magnetic transducer assembly comprising: a wedge-shaped ferrite body having high density and low porosity; a glass gap spacer disposed in a plane that bisects said wedge-shaped body, said body having an aperture disposed along the plane of said glass gap spacer to define a front gap and a rear gap, said wedge-shaped body being formed of an inclined side disposed along a plane which cuts across the front and rear gaps; a single energizing coil coupled through said aperture for transducing signals applied to said magnetic transducer assembly; and a nonmagnetic mounting shoe having a notched portion at one end wherein said body is precisely mounted in a projecting relationship for utilization in a magnetic tape apparatus employing a rotary drum assembly.

References Cited by the Examiner

UNITED STATES PATENTS

| | | | |
|---|---|---|---|
| 2,674,031 | 4/1954 | Buhrendorf | 29—155.57 |
| 2,674,659 | 4/1954 | Buhrendorf | 179—100.2 |
| 2,676,392 | 4/1954 | Buhrendorf | 29—155.58 |
| 2,677,019 | 4/1954 | Buhrendorf | 179—100.2 |
| 2,886,650 | 5/1959 | Fairbanks et al. | 179—100.2 |
| 2,897,267 | 7/1959 | Prince | 178—17 |
| 2,919,312 | 12/1959 | Rosenberger et al. | 179—100.2 |
| 3,026,379 | 3/1962 | Carpenter | 179—100.2 |
| 3,037,092 | 5/1962 | Neumann et al. | 179—100.2 |
| 3,079,470 | 2/1963 | Camras | 179—100.2 |
| 3,124,661 | 3/1964 | Trapp | 179—100.2 |

BERNARD KONICK, *Primary Examiner.*

E. SAX, IRVING L. SRAGOW, *Examiners.*

J. FRANK, F. C. WEISS, *Assistant Examiners.*